Patented June 9, 1931

1,808,893

UNITED STATES PATENT OFFICE

LEON C. HECKERT, OF BRISTOL, PENNSYLVANIA, ASSIGNOR TO RÖHM & HAAS COMPANY, OF PHILADELPHIA, PENNSYLVANIA, A CORPORATION OF DELAWARE

INSECTICIDE

No Drawing.   Application filed May 2, 1930. Serial No. 449,364.

In my co-pending application Serial No. 367,626, filed May 31st, 1929, I disclose a new insecticide comprising an organic thiocyanate the organic residue of which contains a negative group. The instant application is in the nature of a divisional application to cover specifically an aliphatic thiocyanate the organic residue of which contains a negative group, the aromatic thiocyanates being specifically claimed in application 367,626 mentioned above.

This invention relates to insecticides, and is based upon the discovery that certain aliphatic thiocyanates, notably those containing one or more negative elements or groups in the organic radical, possess the unusual insecticidal properties characteristic of thiocyanates but are devoid of certain undesirable properties of other thiocyanates, e. g. offensive and persistent odor and irritant properties.

While it is recognized that the lower alkyl thiocyanates, e. g. methyl thiocyanate and ethyl thiocyanate (Bull. 1313, U. S. Dept. Agr.) possess insecticidal properties, their offensive odor, volatility and irritant action are so marked as to render them and similarly constituted compounds entirely unsuited for use as household insecticides. I have found that this offensive odor, volatility and irritant action can be markedly modified or completely eliminated from the aliphatic thiocyanates by including one or more negative elements or groups such as oxygen, sulphur, iodine or other negative elements or groups in the organic radical attached to the thiocyanate group. Of these negative elements or groups, I have found oxygen to be of especial value, and the inclusion of an oxygen linkage, e. g. carbonyl, alkoxy or ester group, in the organic radical is accompanied by a decided improvement in these objectionable properties.

I have further found that the insecticidal activity of these compounds is so great that they can be satisfactorily employed in solutions or mixtures of considerable dilution, thus allowing their employment in solutions or mixtures containing a large proportion of cheaper substances, thereby materially reducing the cost while having increased the ease of application.

Among the compounds suitable for my invention are: thiocyano acetone, amyl thiocyanacetate, cyclohexyl thiocyanacetate, sec-octyl thiocyanacetate, beta-ethoxyethyl thiocyanacetate, amyl beta-thiocyanopropionate, butyl beta-thiocyanopropionate, cyclohexyl beta-thiocyanopropionate, sec-octyl beta-thiocyanopropionate, beta-ethoxyethyl beta-thiocyanopropionate, beta-thiocyanoethyl ethyl ether, beta-thiocyanoethyl butyl ether, the beta-thiocyano derivatives of the mono-alkyl ethers of diethylene glycol, in which the alkyl group may be any aliphatic group of comparatively low molecular weight, e. g. methyl, ethyl, propyl, butyl, etc. These compounds are merely concrete examples of the type that may be employed, and I do not limit myself to these specific compounds, they being given simply as a means for clearly describing my invention.

*Example I.*—About 1 gram of the thiocyanate of the mono-ethyl ether of diethylene glycol is dissolved in sufficient water to make the total volume 100 cc. A small amount, e. g. ½%, of neutral soap may be added to secure increased spreading, although it is not essential. If the resulting solution is sprayed in a room or other space containing flies, the results obtained are striking, it being usually possible by this procedure to eliminate the flies practically completely within a very short period, e. g. five minutes, the result being a visible accumulation of dead flies upon the door.

*Example II.*—About 1 gram of the thiocyanate of the monobutyl ether of diethylene glycol is dissolved in sufficient organic solvent, e. g. kerosene, to make the total volume 100 cc. If this solution is used in the same manner as in Example I, the results are substantially the same.

*Example III.*—About 1 gram of sec-octyl thiocyanacetate is dissolved in sufficient organic solvent, e. g. kerosene, to make the total volume 100 cc. If this solution is used in the same manner as in Example I, the results are substantially the same.

*Example IV.*—About 1 gram of beta-ethoxyethyl beta-thiocyanopropionate is dissolved in sufficient organic solvent, e. g. kerosene, to make the total volume 100 cc. If this solution is used in the same manner as in Example I, the results are substantially the same.

What I claim is:

1. An insecticide comprising an aliphatic thiocyanate, the organic residue of which comprises a negative group.

2. An insecticide comprising an aliphatic thiocyanate, the organic residue of which comprises a negative group, dissolved in a petroleum distillate such as kerosene.

3. An insecticide comprising an aliphatic thiocyanate, the organic residue of which comprises an ester linkage.

4. An insecticide comprising an aliphatic thiocyanate, the organic residue of which comprises an ether linkage.

5. An insecticide comprising the thiocyanate of the mono-alkyl ether of diethylene glycol.

6. An insecticide comprising the thiocyanate of the mono-butyl ether of diethylene glycol.

7. An insecticide comprising an aliphatic mono-thiocyanate, the organic residue of which comprises a negative group.

8. An insecticide comprising beta-ethoxyethyl thiocyanoacetate.

9. An insecticide comprising thiocyano acetone.

LEON C. HECKERT.